Sept. 6, 1955 W. H. LEE 2,717,349
SPEED CONTROL FOR INDUCTION MOTORS
Filed May 22, 1951
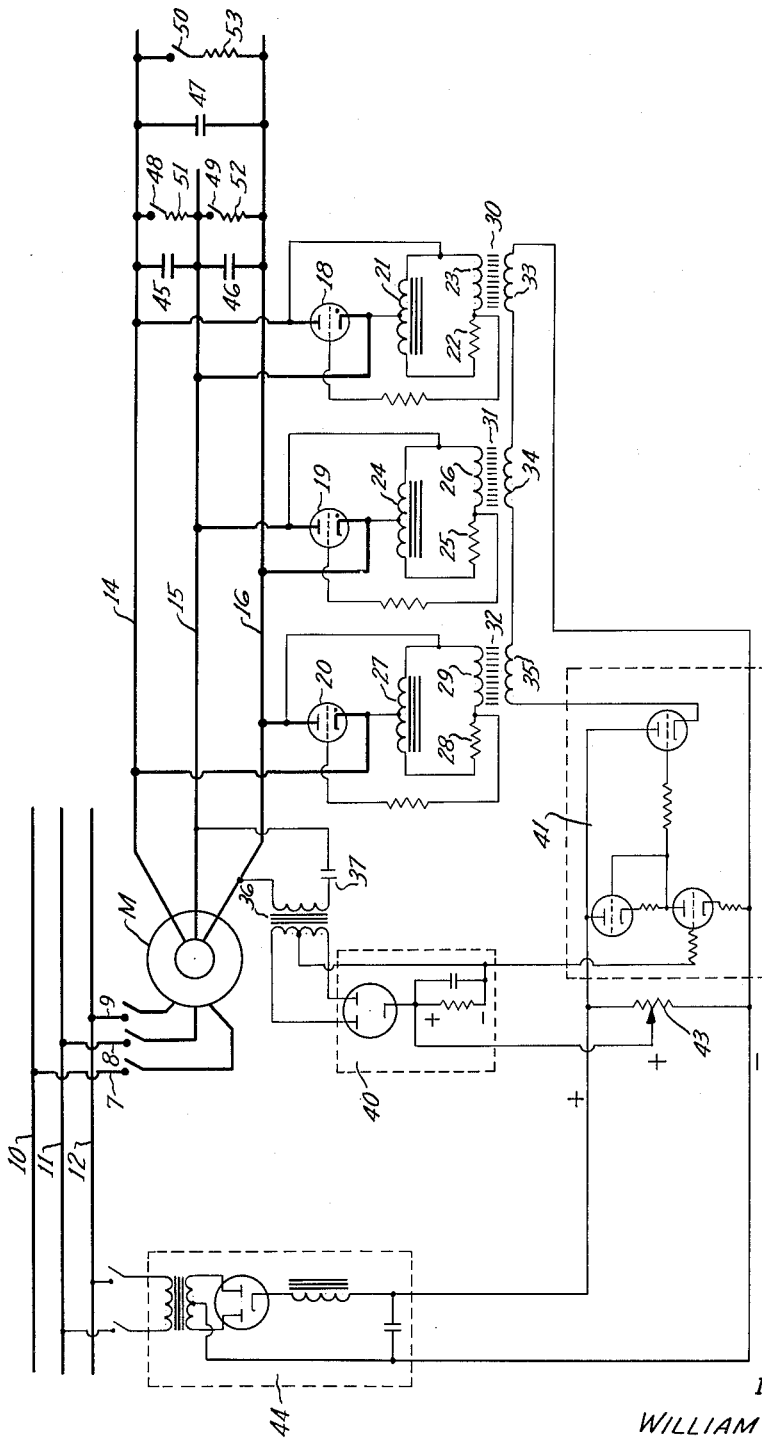
INVENTOR.
WILLIAM H. LEE
BY
Bosworth + Sessions
ATTORNEYS.

United States Patent Office 2,717,349
Patented Sept. 6, 1955

2,717,349

SPEED CONTROL FOR INDUCTION MOTORS

William H. Lee, Norris, Tenn.

Application May 22, 1951, Serial No. 227,720

8 Claims. (Cl. 318—237)

This invention relates to the control of alternating current motors and more particularly to a speed control especially adapted for polyphase induction motors of the wound rotor type.

Induction motors are highly advantageous because of their simple construction, sturdiness and efficiency, but their application has been limited because of the difficulties encountered in attempting to control their speed. Methods heretofore employed for controlling the speed of an induction motor have not permitted the smooth and accurate control of speed from zero to the rated speed of the motor, the efficiency of the motor at reduced speeds has been low, and some methods require expensive equipment and motors of special design.

It is therefore a general object of the present invention to provide a speed control for induction motors, and particularly for polyphase, wound rotor induction motors in which the speed may be controlled accurately and smoothly from zero to the maximum speed of the motor. A further object is to provide such a system in which reasonable efficiency of operation can be obtained. A further object is to provide a motor speed control apparatus embodying relatively inexpensive components. Further objects and advantages of the invention will become apparent from the following description of a preferred form thereof, reference being made to the accompanying drawing.

It has heretofore been proposed to control the speed of induction motors by the use of electronic controls for the secondary circuits. Circuits heretofore proposed, however, have not gone into substantial use, apparently because of the complexity of the circuits, the cost and bulkiness of the components and the lack of satisfactory operating characteristics. According to the present invention the impedance of secondary of a wound rotor induction motor is controlled by controlled arc discharge electronic tubes preferably of the thyratron type connected directly into the secondary circuits, and the firing of the tubes is controlled by phase shift circuits associated with the tubes. The result is a simple and compact control system, whereby the speed of the motor can be accurately controlled from standstill to maximum, which may be from 70% to 95% of synchronous speed, depending upon the design of the motor and control circuits.

Referring to the drawing, in which a preferred form of my invention is illustrated, a conventional three phase wound rotor induction motor is indicated at M. In this motor the stator is the primary and is supplied with three phase alternating current through conductors 7, 8 and 9 which lead to any convenient source such as power lines 10, 11 and 12. The rotor of the motor constitutes the secondary; the rotor windings are connected through conventional slip rings and brushes to conductors 14, 15 and 16. In order to control the impedance of the secondary of the motor and hence to control the motor speed, thyratrons 18, 19 and 20 are connected in the secondary circuit. The anode of thyratron 18 is connected to conductor 14 and its cathode is connected to conductor 15; the anode of thyratron 19 is connected to conductor 15 and its cathode to conductor 16, and the anode of thyratron 20 is connected to conductor 16 and its cathode is connected to conductor 14, thereby providing a delta connection.

The grids of the thyratrons control the firing thereof and hence control the impedance of the secondary circuit. If the grid voltage exceeds the critical voltage of the tubes late in the positive half-cycle of the anode or plate voltages thereof, then the tubes fire late in the positive half-cycles, the impedance of the tubes and of the secondary circuit of the motor is relatively great and the motor operates at slow speed. If the phase relationship between the grid and plate voltages of the tubes is changed so that the critical voltage is exceeded earlier in the positive half-cycles of plate voltage, then tubes fire earlier in the positive half-cycles, the impedance of the secondary circuit is reduced and the motor operates at greater speed; the maximum speed of the motor is obtained when the tubes are fired substantially at the beginning of each positive half-cycle of the plate or anode current.

In order to control the firing of the tubes 18, 19 and 20, I preferably energize the grids of the tubes through phase shifting networks as shown in the drawing. The network for tube 18 includes the center tapped autotransformer 21, resistor 22 and reactance 23. Corresponding elements for tubes 19 and 20 are shown at 24, 25 and 26 and 27, 28 and 29 respectively.

The reactances 23, 26 and 29 constitute the primaries of transformers (audio-frequency radio transformers are satisfactory for this service in most cases) having saturable cores 30, 31 and 32, and secondaries 33, 34 and 35 which are delta connected as shown. The reactances 23, 26 and 29 may also be considered as the A. C. windings of saturable core reactors having cores 30, 31 and 32, the D. C. windings 33, 34 and 35 of which are series connected as shown. It will be evident that the reactance of the windings 23, 26 and 29 can be reduced by saturating the cores 30, 31 and 32. Reduction of the reactance in the phase shifting networks reduces the lag of the grid voltages with respect to the plate voltages of the tubes and hence causes the tubes to fire earlier, reducing the impedance of the motor secondary circuit.

In order to control magnetization of the cores 30, 31 and 32 and hence the reactance of windings 23, 26 and 29 and the firing of tubes 18, 19 and 20, a D. C. voltage is supplied to the delta connected secondaries or D. C. windings 33, 34 and 35. This voltage is obtained from the secondary of the motor by connecting the primary of transformer 36 across two of the secondary conductors, for example, across conductors 15 and 16 as shown, a condenser 37 preferably being in series with the primary of transformer 36. If desired a polyphase transformer connected across a corresponding number of phases of the secondary could be used in place of the single phase transformer illustrated. The secondary of transformer 36 is connected to a rectifier 40 which may be of any suitable construction; the output of the rectifier is preferably (but not necessarily) amplified by amplifier 41, which also may be of any suitable construction, and the D. C. voltage so obtained applied to the windings 33, 34 and 35, a variable resistance 43 being included in the circuit in order to provide for manual control of the applied voltage and of the motor speed. Power for the amplifier is supplied by rectifier 44 from the supply mains 11 and 12. By utilizing the same A. C. supply for the amplifier and the motor, effects of line voltage fluctuation on motor speed are minimized.

If desired, condensers 45, 46 and 47 may be connected across the conductors 14, 15 and 16 for the purpose of power factor correction.

It is a characteristic of induction motors that the frequency and voltage of the secondary currents increase as the speed of the motor decreases and vice-versa. With a circuit such as that shown, a decrease in the speed of the motor resulting, for example, from an increase in load increases the voltage output of the secondary of transformer 36 not only because of increase in the voltage across conductors 15 and 16, but also because the impedance of condenser 37 decreases with the increased frequency of the motor secondary currents. This increased voltage is rectified and amplified and applied to the windings 33, 34 and 35 resulting in an increase in the saturation of the cores 30, 31 and 32 and a reduction of the reactances of the A. C. windings 23, 26 and 29. This results in shifting the phase of the grid voltages and advancing the firing of the tubes 18, 19 and 20. Consequently the impedance of the motor secondary is reduced and the motor speed is restored to the desired value. When the speed of the motor increases, for example, by reason of a decrease in load, opposite effects take place and the motor speed is decreased to its former value. The D. C. voltage applied to the windings 33, 34 and 35 can be manually adjusted by means of the resistor 43 so that the speed of the motor can be adjusted to any desired value within its operating range and thereafter the motor maintains substantially the desired speed regardless of variations in load within the capacity of the motor. Condenser 37 and amplifier 41 increase the sensitivity of the control; condenser 37 by making the control responsive to the frequency of the motor secondary current, and amplifier 41 by amplifying the output of rectifier 40.

With an apparatus of the type described and a conventional wound rotor induction motor, it is possible to obtain smooth and accurate control of the motor speed from zero to approximately 70% to 95% of synchronous speed so long as there is some load connected to the motor. The present circuit will not control the motor at low speeds under no-load conditions because the phase shift circuit will not entirely prevent the firing of the tubes. If it is desired to operate the motor at a higher percentage of synchronous speed than can be obtained through the thyratron control, contactors 48, 49 and 50 may be closed to complete the secondary circuits through low-resistance resistors 51, 52 and 53, thereby reducing the impedance of the secondary circuit by cutting out the thyratrons 18, 19 and 20 and substituting for them the low resistance paths provided by the resistors.

From the foregoing, it will be evident that I have provided effective adjustable speed control for wound rotor induction motors. The components of the circuits are well known and reliable and can be obtained at reasonable cost. The control elements are compact and the operation of a motor equipped with my control is substantially foolproof. The system can be adapted readily to wound rotor induction motors of different sizes and types by those skilled in the art. While the preferred form of the invention disclosed herein employs thyratrons to control the secondary currents, other types of controlled arc discharge devices may be employed.

I claim:

1. Apparatus for controlling the speed of a wound rotor induction motor comprising a plurality of thyratrons, means connecting the plate and cathode circuits of the thyratrons and the secondary windings of the motor whereby the thyratrons control the impedance of the motor secondary, phase shifting networks connected with the grids of each thyratron to control the firing thereof, each network including the A. C. winding of a saturable core reactor, the D. C. windings of the reactors being series connected, and circuits for supplying direct current to said D. C. winding to vary the magnetization of the cores of said reactors and thereby vary the reactance of said primaries and shift the phase of the grid voltage of said thyratrons, said direct current supply circuits including a transformer having its primary connected across at least one phase of the motor secondary, a condenser in series with said primary, a rectifier in circuit with the secondary of said transformer, and an amplifier for amplifying the direct current output of said rectifier.

2. Apparatus according to claim 1 wherein auxiliary contactors are provided to connect low-resistance circuits across said thyratrons thereby cutting out the impedance of said thyratrons for full load, high speed operation of said motor.

3. Apparatus for controlling the speed of a wound rotor induction motor comprising a plurality of controlled arc discharge devices connected to the secondary of the motor and adapted to control the impedance thereof, each arc discharge device having a control electrode, phase shifting networks connected with the control electrodes of each discharge device to control the firing thereof, each network including the A. C. winding of a saturable core reactor, and circuits for supplying direct current to the D. C. windings of said reactors to vary the magnetization of the cores of said reactors and thereby vary the reactance of said A. C. windings and control the firing of said discharge devices, said direct current supply circuits including a transformer having its primary connected across at least on phase of the motor secondary, a condenser in series with said primary, a rectifier in circuit with the secondary of said transformer, and an amplifier for amplifying the direct current output of said rectifier.

4. Apparatus for controlling the speed of a wound rotor comprising a plurality of thyratrons connected to the secondary of the motor and adapted to control the impedance thereof, phase shifting networks connected with the grids of each thyratron to control the firing thereof, each network including the A. C. winding of a saturable core reactor, and a circuit for supplying direct current to the D. C. windings of said reactors to vary the magnetization of the cores of said reactors and thereby vary the reactance of said A. C. windings and shift the phase of the grid voltages of said thyratrons, said direct current supply circuit including a transformer having its primary connected across at least one phase of the motor secondary, a condenser in series with said primary, and a rectifier in circuit with the secondary of said transformer.

5. Apparatus for controlling the speed of a wound rotor induction motor comprising a plurality of thyratrons connected to control the impedance of the secondary thereof, phase shifting networks connected with the grids of each thyratron to control the firing thereof, each network including the A. C. winding of a saturable core reactor and a circuit controlled by the speed of the motor for supplying direct current to the D. C. windings of said reactors to vary the magnetization of the cores of said reactors and thereby vary the reactance of said A. C. windings and shift the phase of the grid voltages of said thyratrons.

6. Apparatus for controlling the speed of a wound rotor induction motor comprising a plurality of controlled arc discharge devices in circuit with the secondary of the motor and adapted to control the impedance of the motor secondary, and a circuit for controlling the firing of the discharge devices, said circuit including a transformer having its primary connected across at least one phase of the motor secondary, a condenser in series with said transformer primary, a rectifier in circuit with the secondary of said transformer, and means responsive to the output of said rectifier for controlling the firing of said discharge devices.

7. Apparatus according to claim 6 wherein the controlled arc discharge devices are thyratrons.

8. Apparatus for controlling the speed of a wound rotor induction motor comprising a plurality of controlled arc discharge devices connected to the secondary of the motor and adapted to control the impedance thereof, each arc discharge device having a control electrode, phase shifting networks connected with the control electrodes of each arc discharge device to control the firing thereof, each network including the A. C. winding of a saturable core reactor and circuits for supplying direct current to the D. C. windings of said reactors to vary the magnetization of the cores of said reactors and thereby vary the reactance of said A. C. winding and control the firing of said discharge devices, said direct current supply circuits including means for deriving a voltage from the motor secondary and means for rectifying the derived voltage.

References Cited in the file of this patent

UNITED STATES PATENTS

| | | |
|---|---|---|
| 1,411,862 | Meyer | Apr. 4, 1922 |
| 1,442,728 | Meyer | Jan. 16, 1923 |
| 1,603,137 | Meyer | Oct. 12, 1926 |
| 2,179,569 | Young | Nov. 14, 1939 |
| 2,238,613 | Wickerham | Apr. 15, 1941 |
| 2,501,361 | Taylor | Mar. 21, 1950 |
| 2,674,709 | Ernsberger | Apr. 6, 1954 |

FOREIGN PATENTS

| | | |
|---|---|---|
| 833,946 | France | Aug. 1, 1938 |